(12) United States Patent
Underhill et al.

(10) Patent No.: US 9,449,303 B2
(45) Date of Patent: Sep. 20, 2016

(54) NOTEBOOK DRIVEN ACCUMULATION OF MEETING DOCUMENTATION AND NOTATIONS

(75) Inventors: Thomas Underhill, Seattle, WA (US); Cynthia Wessling, Redmond, WA (US); Apeksha Godiyal, Bellevue, WA (US); Syed Mustafa Bilal, Bellevue, WA (US); Hong Lin, Bellevue, WA (US); Nathaniel Stott, Redmond, WA (US); Charles Duze, Sammamish, WA (US); Po-Yan Tsang, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 93 days.

(21) Appl. No.: 13/353,338

(22) Filed: Jan. 19, 2012

(65) Prior Publication Data

US 2013/0191719 A1 Jul. 25, 2013

(51) Int. Cl.
*G06F 17/22* (2006.01)
*G06Q 10/10* (2012.01)
*H04L 12/18* (2006.01)

(52) U.S. Cl.
CPC ............ *G06Q 10/10* (2013.01); *G06Q 10/109* (2013.01); *G06Q 10/1095* (2013.01); *H04L 12/1818* (2013.01)

(58) Field of Classification Search
CPC ...... G06F 17/00; G06F 17/20; G06F 17/241; G06F 17/278; G10L 15/265; G06K 9/00751; G06Q 10/1095; G06Q 10/109; H04L 12/1818
USPC ....... 715/200, 205, 234, 700, 738, 739, 751, 715/758, 759, 760, 762, 784, 785, 786
See application file for complete search history.

(56) References Cited

U.S. PATENT DOCUMENTS

| | | | | |
|---|---|---|---|---|
| 5,970,455 A * | 10/1999 | Wilcox et al. | ................ | 704/270 |
| 6,654,032 B1 * | 11/2003 | Zhu et al. | ..................... | 715/753 |
| 7,213,051 B2 * | 5/2007 | Zhu et al. | ..................... | 709/205 |
| 7,392,484 B1 * | 6/2008 | Garfinkel et al. | ............ | 715/751 |
| 7,428,000 B2 * | 9/2008 | Cutler et al. | ............... | 348/14.11 |
| 7,461,347 B2 * | 12/2008 | Zhu et al. | ..................... | 715/751 |
| 7,660,851 B2 * | 2/2010 | Manion | .................. | G06Q 10/10 709/204 |

(Continued)

FOREIGN PATENT DOCUMENTS

| KR | 10-2007-0069395 A | 7/2007 |
|---|---|---|
| KR | 10-2011-0132643 A | 12/2011 |

OTHER PUBLICATIONS

"SharePoint Integration with Office", Sep. 21, 2011, 6 pages.*

(Continued)

*Primary Examiner* — Maikhanh Nguyen
(74) *Attorney, Agent, or Firm* — Tom Wong; Micky Minhas

(57) ABSTRACT

A notebook component within a note-taking application is utilized as a centralized mechanism for recording notations and providing documentation related to a particular meeting. The meeting participants are provided with centralized access to the notebook component and thus are able to update the notebook record of the meeting collaboratively and in real time. In addition to user-driven updates, updates may also be generated on an automatic or semi-automatic basis. Updates may be made before, during or after the actual meeting. Updates may originate from an application data source outside of the note-taking application itself.

20 Claims, 13 Drawing Sheets

(56) References Cited

U.S. PATENT DOCUMENTS

| | | | |
|---|---|---|---|
| 7,660,852 B2* | 2/2010 | Flannery et al. | 709/204 |
| 8,214,395 B2* | 7/2012 | Stevens | G06Q 10/10 707/608 |
| 8,266,534 B2* | 9/2012 | Curtis et al. | 715/753 |
| 8,768,705 B2* | 7/2014 | Sundararaman et al. | 704/270 |
| 2003/0208534 A1* | 11/2003 | Carmichael | 709/203 |
| 2004/0001093 A1* | 1/2004 | Sellers et al. | 345/766 |
| 2004/0059785 A1* | 3/2004 | Blume | G06Q 10/109 709/206 |
| 2004/0064322 A1 | 4/2004 | Georgiopoulos et al. | |
| 2004/0109021 A1* | 6/2004 | Price | 345/753 |
| 2004/0141005 A1* | 7/2004 | Banatwala | H04L 12/1813 715/751 |
| 2004/0158586 A1* | 8/2004 | Tsai | G06Q 10/10 |
| 2004/0168133 A1* | 8/2004 | Wynn | G06Q 10/109 715/255 |
| 2004/0263636 A1* | 12/2004 | Cutler et al. | 348/211.12 |
| 2005/0027800 A1* | 2/2005 | Erickson | H04L 12/1822 709/204 |
| 2005/0114521 A1* | 5/2005 | Lee | G06F 17/241 709/228 |
| 2005/0125246 A1* | 6/2005 | Muller | G06Q 10/10 705/300 |
| 2005/0131714 A1* | 6/2005 | Braunstein | G06Q 30/02 709/204 |
| 2005/0144231 A1* | 6/2005 | Burckart et al. | 709/204 |
| 2006/0026502 A1* | 2/2006 | Dutta | G06Q 10/10 715/230 |
| 2006/0047816 A1 | 3/2006 | Lawton et al. | |
| 2006/0224430 A1* | 10/2006 | Butt | G06Q 10/063116 705/7.16 |
| 2006/0265262 A1* | 11/2006 | Kamdar | G06Q 10/109 705/80 |
| 2007/0011233 A1* | 1/2007 | Manion | G06Q 10/10 709/204 |
| 2007/0100939 A1* | 5/2007 | Bagley et al. | 709/204 |
| 2007/0112926 A1* | 5/2007 | Brett | G06Q 10/109 709/206 |
| 2007/0250506 A1* | 10/2007 | Stevens | G06Q 10/10 |
| 2007/0271337 A1* | 11/2007 | Olson | 709/204 |
| 2008/0033957 A1* | 2/2008 | Forstall | G06Q 10/109 |
| 2008/0114636 A1* | 5/2008 | Nellutla | 705/9 |
| 2008/0154687 A1* | 6/2008 | Lin | 705/9 |
| 2008/0244442 A1* | 10/2008 | Veselova et al. | 715/781 |
| 2009/0006608 A1* | 1/2009 | Gupta et al. | 709/224 |
| 2009/0006982 A1 | 1/2009 | Curtis et al. | |
| 2009/0018887 A1* | 1/2009 | Bank et al. | 705/8 |
| 2009/0043852 A1 | 2/2009 | Weir et al. | |
| 2009/0192845 A1* | 7/2009 | Gudipaty et al. | 705/7 |
| 2009/0222741 A1* | 9/2009 | Shaw et al. | 715/753 |
| 2009/0307607 A1* | 12/2009 | Schauls et al. | 715/752 |
| 2009/0319916 A1* | 12/2009 | Gudipaty et al. | 715/753 |
| 2010/0131836 A1* | 5/2010 | Dukhon | G06F 17/241 715/230 |
| 2010/0228825 A1* | 9/2010 | Hegde et al. | 709/204 |
| 2010/0241972 A1 | 9/2010 | Spataro et al. | |
| 2011/0099006 A1* | 4/2011 | Sundararaman | G10L 15/26 704/208 |
| 2013/0103446 A1* | 4/2013 | Bragdon et al. | 705/7.15 |

OTHER PUBLICATIONS

"Using Cloud Storage and Note-taking Applications", Mar. 23, 2012, 2 pages.*
S. Sen "An Automated Distributed Meeting Scheduler", IEEE, 1996, pp. 1-13.*
Yankelovich et al. "Meeting Central: Making Distributed Meetings More Effective", Sun Microsystems, 2004, 10 pages.*
"International Search Report", Mailed Date: Apr. 29, 2013, Application No. PCT/US2013/021506, Filed Date: Jan. 15, 2013, pp. 10.
Naumenko, et al., "Information Management with Meeting Automation Tool", Retrieved at <<http://infoscience.epfl.ch/record/219/files/TR00_001.pdf>>, Proceedings of the 2000 information resources management association international conference on Challenges of information technology management in the 21st century, 2000, pp. 9.
"Intelligent Meeting Management", Retrieved at <<http://www.iqm2.com/Products/MinuteTraq.aspx>>, May 26, 2009, pp. 6.
"Board and Meeting Manager", Retrieved at <<http://www.technologyonecorp.com/media/docs/BAMM.pdf>>, Feb. 19, 2011, pp. 2.
"Tekaria", Retrieved at <<http://www.tekaria.com/>>, Feb. 3, 2011, p. 1.
"Meeting Manager: Roll Call", Retrieved at <<http://www.zippymeetings.com/features/roll-call/>>, Retrieved date: Jan. 18, 2012, pp. 3.
Supplementary Search Report Issued in European Patent Application No. 13738151.3, Mailed Date: Jul. 16, 2015, 6 Pages.

* cited by examiner

NOTEBOOK DRIVEN ACCUMULATION OF MEETING DOCUMENTATION AND NOTATIONS

BACKGROUND

Attendees of a meeting, whether participating in person or remotely, will often make notations about the meeting. For example, an attendee will commonly make a record of who did or did not attended the meeting, of when and where the meeting occurred, of what was discussed or presented, and/or of what related action items require follow-up after the meeting. This is certainly a non-exclusive list of potential meeting notations.

It is very common for a meeting attendee to handwrite meeting notes. It then requires significant effort to clean up the notes, transfer them to a typed digital format, and to then share the notes with meeting participants, which is often desired. These processes require a significant investment of time and energy. Further, tasks associated with these processes often require switching between multiple different software tools such as email and calendar tools. Still further, substantial effort is often required to search for and identify the original meeting invitees and/or to obtain content or other documentation (e.g., a slide deck) distributed or presented during the meeting. Finally, it is particularly cumbersome to accumulate and consolidate meeting-related information and documentation from any or all meeting participants, especially when such information is produced and/or distributed before or after the meeting has been conducted.

This is not to say that there have not been attempts to address some of the challenges associated with accumulating meeting documentation and notations. Some online and in-person meetings are audio and/or video recorded. In such cases, users may at least feel relieved of the burden of having to take handwritten notes. However, to have a text record of the meeting, a human or some sort of automated or semi-automated technology is depended upon to transcribe what was spoken during the meeting. This dependence is limited in terms of convenience and practicality. For example, the generated transcriptions are unlikely to be summarized and therefore can be quite lengthy, which means a relatively large amount of time is required for consumption of the information.

Currently, there are online meeting applications that provide meeting participants with an area for entering notes. However, significant effort is still required to handle and process the created notes. For example, tasks such as emailing the notes out to others (e.g., other meeting participants) or further editing the notes with specialized text editing tools often requires exporting the notes to another application. Further, the notes recorded in these electronic environments are generally limited to being user-generated during the meeting itself or immediately thereafter, before the online meeting application is closed.

SUMMARY

Embodiments described herein pertain to utilization of a notebook component within a note-taking application as a centralized mechanism for recording notations and providing documentation related to a particular meeting. The meeting participants are provided with centralized access to the notebook component and thus are able to update the notebook record of the meeting collaboratively and in real time. In addition to user-driven updates, updates may also be generated on an automatic or semi-automatic basis. Updates may be made before, during or after the actual meeting. Updates may originate from an application data source outside of the note-taking application itself.

DETAILED DESCRIPTION OF ILLUSTRATIVE EMBODIMENTS

Figure 1:
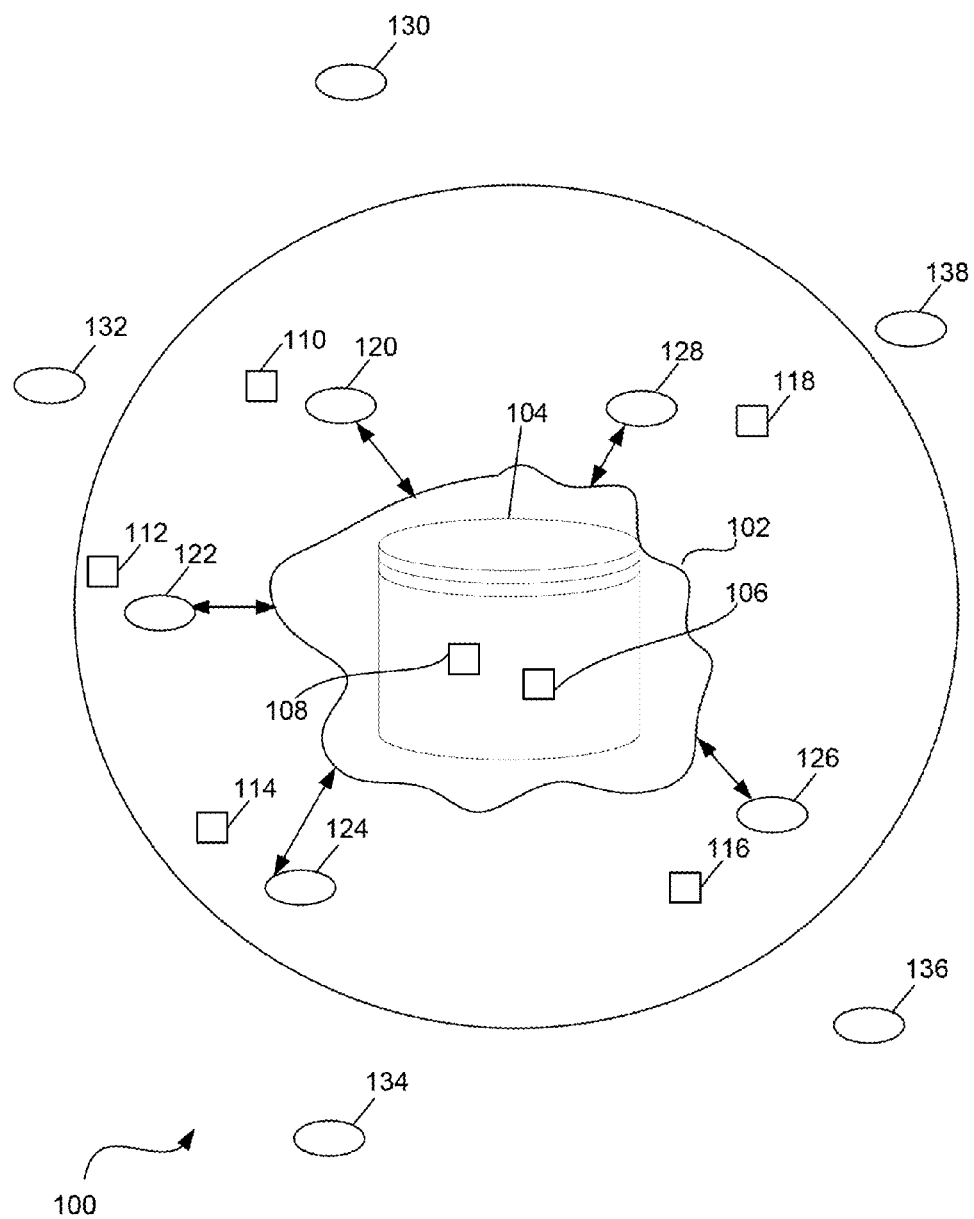
FIG. 1 is a simplified schematic diagram of a note-taking application architecture.

FIG. 1 is a simplified schematic diagram of exemplary note-taking application architecture 100. A plurality of application users 110, 112, 114, 116 and 118 operate a plurality of corresponding computing devices 120, 122, 124, 126 and 128, respectively. These users each also have an alternate computing device available to them. The alternate devices are labeled 130, 132, 134, 136 and 138 (which correspond to users 110-118, respectively). Each user illustratively operates a note-taking application by way of interactions with their device and/or alternate device. The devices and alternate devices shown in FIG. 1 may be any of a wide variety of computing devices including, but not limited to, laptop computers, personal digital assistants, mobile phones, pad computers, personal computers, e-reader devices, multi-touch input/output panels, etc. Of course, users 110-118 may have more or less devices for operating the note-taking application.

When the users 110-118 utilize one of their computing devices to interact with the note-taking application, part of this interaction illustratively involves storage and retrieval of application content relative to a "cloud-based" database server 104. The database symbol utilized to represent server 104 is intended to represent all server components, including but not limited to the actual database components themselves. Database server 104 is shown in FIG. 1 within network architecture 102 (e.g., a cloud). Those skilled in the art will appreciate that this signifies that server 104 operates a network and is remotely accessed by any or all of devices 120-138 in accordance with user-initiated commands.

The precise details of the network implementation of the note-taking application are not necessarily critical to the present invention. In one embodiment, the note-taking application includes application components that run at least partially from the devices 120-138. However, it is also within the scope of the present invention for the application to be partially, primarily or completely operable from a network location, for example, from within network architecture 102 (e.g., a cloud). In this case, any or all of devices 120-138 may include a separate application such as a network browser application for facilitating interaction with the note-taking application. Any combination of remote or client-based distribution of functions or components of the note-taking application are to be considered within the scope of the present invention.

Regardless of the particular distribution of the note-taking application functionality, it is consistent with one embodiment of the present invention for a collection of content data 106 to be stored within database server 104, which is made accessible by way of network architecture 102 (e.g., the Internet or "the cloud"). The note-taking application is illustratively a free-form information gathering and multi-user collaboration platform that enables the users 110-118 to store notes, drawings, screen clippings, audio, video and any other item of content as part of content data 106. Access to the content is selectively shared among the users based on certain preferences and system settings. When one or more of users 110-118 desire to share all or parts of their own content data 106 with other of the users, functions are included within the note-taking application to enable them to adjust system parameters to share or not share with others as they see fit. Other sharing policies may be imposed, for example, based on security restrictions or other system-imposed requirements, etc.

In one embodiment, the note-taking application differs from a traditional word processing application at least in that it supports more flexible user collaboration and is more free-form in terms of how and where users are allowed to submit and edit content by way of the application user interfaces. Further, in one embodiment, users of the note-taking application generally are not required to issue a save order or command because the note-taking application automatically saves the data, for example as it is entered. Still further, in one embodiment, the note-taking application is configured to conveniently assist in the user-initiated organization of content into what is essentially an electronic manifestation of a notebook-style (e.g., tabbed) organization system. Users of the application are provided with functions that enable them to selectively tab, re-tab, re-organize, add content to, subtract content from, and otherwise manipulate content stored on notebook pages that are selectively placed and moved around within electronic notebooks and the various tabbed components thereof.

In one embodiment, the client components of the note-taking application support user-driven online editing essentially in real time but also support user-driven off-line editing and then later synchronization of the edits with database server 104. In another embodiment, the application allows collaboration in that more than one person can work on "the same notebook page" or within "the same notebook" at the same time. These are but examples of features of an illustrative note-taking application. The scope of the present invention is not limited to a system that includes an exact combination or configuration of features as described herein. Other combinations and configurations of features should also be considered within the scope. For example, while the architecture shown in FIG. 1 shows only one database server 104, those skilled in the art will appreciate that there might actually be many databases distributed in what might even be a relatively complex data storage and distribution scheme.

As is reflected in FIG. 1, it is common for users of a note-taking application to interact with the application utilizing more than one computing device. As the popularity of mobile devices continues to increase, it is likely to become even more common for users to access and utilize such an application from any or all of their available mobile, client, browser and other device interfaces. It is therefore desirable for the note-taking application to support a user experience that is as consistent as possible from one device to the next. In another words, it is probably not a good strategy to assume that users 110-118 are likely to always or even most often use a single device (e.g., a single PC or a single mobile device) when interacting with the application. This being the case, an ideal application design will enable users 110-118 to manage content data 106 in a consistent manner from one use session to the next regardless of whether they are interacting from their primary computing devices 120-128, their alternate computing devices 130-138, or some other computing device.

A logical place to start in terms of maintaining a consistent user experience across multiple devices is to configure the application system to provide users with access to content in a generally device independent manner. For example, if user 110 utilizes device 120 to make a change to the content of a note, the user will ideally see that change made when he or she later accesses the same note utilizing device 130. Or, if user 116 utilizes device 126 to make a change to the content of a note to which user 110 has access, user 110 will ideally see that change regardless of which device he or she uses to retrieve the note. It is not ideal for a user to be forced to deal with the potential inconveniences of device dependence when it comes to content changes and additions.

As has been alluded to, some or all of the content of the note-taking application is illustratively maintained in a centrally accessible storage location such that additions, changes and deletions pertinent to the centrally stored content data are made available to users in a generally device independent manner. For example, by storing a latest version of application content (e.g., as content data 106), it becomes possible to provide that version of the content to essentially any device. In essence, modifications or additions to content are made to roam so as to be apparent regardless of being accessed from one particular device or another. All of this assumes, of course, enforcement of content access restrictions as appropriate in light of applicable application access policies, if any (e.g., user-initiated and/or automatically applied content sharing restrictions, etc.).

Content changes and additions are not the only aspects of the note-taking application that may be configured to roam in a device independent manner as described. Device-to-device application consistency is illustratively also supported for application configuration variables and settings, such as but not necessarily limited to user-selected application configuration variables and settings. For example, if user 110 utilizes device 120 to cause a change to an application configuration variable or setting, the user will ideally again see the impact of that change when he or she later interacts similar with the application utilizing device 130. Or, if user 116 utilizes device 126 to cause a change to an application configuration variable or setting in a manner that affects the application experience of user 110, user 110 ideally will see the impact of that change regardless of which device is used to interact with the application. This roaming of application configuration variables and settings furthers the goal of supporting access source flexibility while minimizing the negative impact of such flexibility on the consistency of the user experience.

Figure 2:
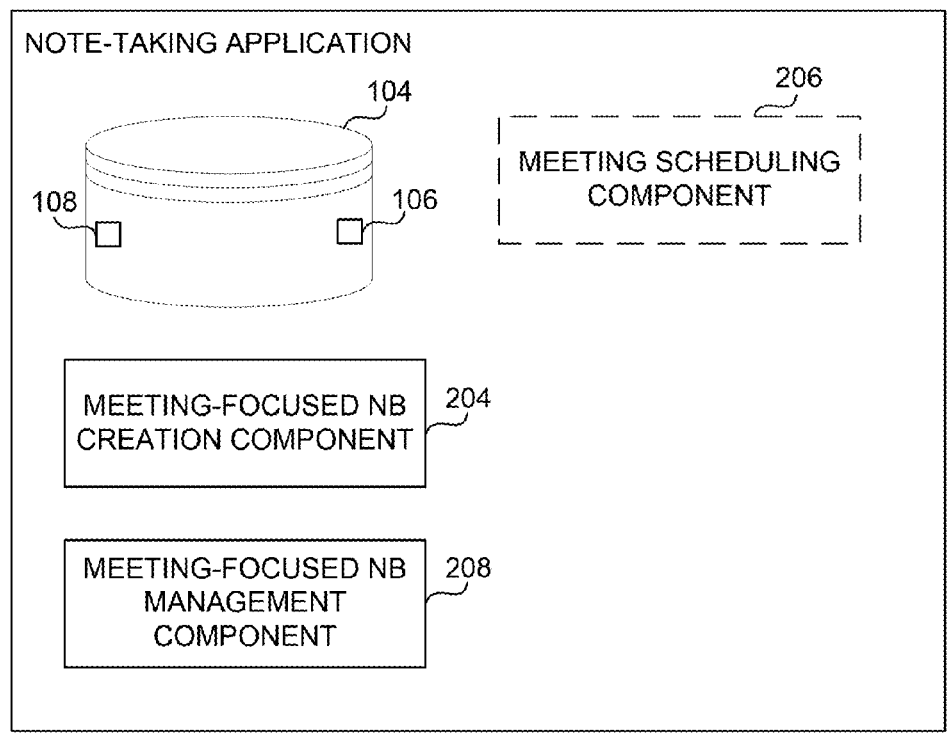
FIG. 2 is a simplified schematic representation of a note-taking application.

The description of the note-taking application in relation to FIG. 1 was centered upon the illustrated database server 104 but was described as including a combination of client and server components. FIG. 2 is a simplified schematic representation of the note-taking application. This depiction again includes database server 104 but also includes other application components. While these additional application components are not shown within the boundaries of the database server 104, it is to be assumed that they may be so implemented or not so implemented without departing from the scope of the present invention. In fact, for the purpose of simplifying the description of the application, no attempt is made in FIG. 2 to show how the various application components are distributed in terms of the client-server architecture or relative to one another. Those skilled in the art will appreciate that such details are again not critical to the scope of the present invention. It should be assumed that the application components shown and described herein, as well as any additional necessary or desirable components, can be distributed across the client-server architecture in any manner without departing from the scope of the present invention.

Those skilled in the art will also appreciate that the scope of the present invention is not limited to "hub and spoke" or cloud based architectures as shown and described herein. Embodiment of the present invention could just as easily be implemented in the context of a different architecture, such as in a peer-to-peer based to implementation rather than a sever based implementation. The centralized application environments described herein are exemplary only and should not be construed as limiting the scope of the present invention.

Figure 3:
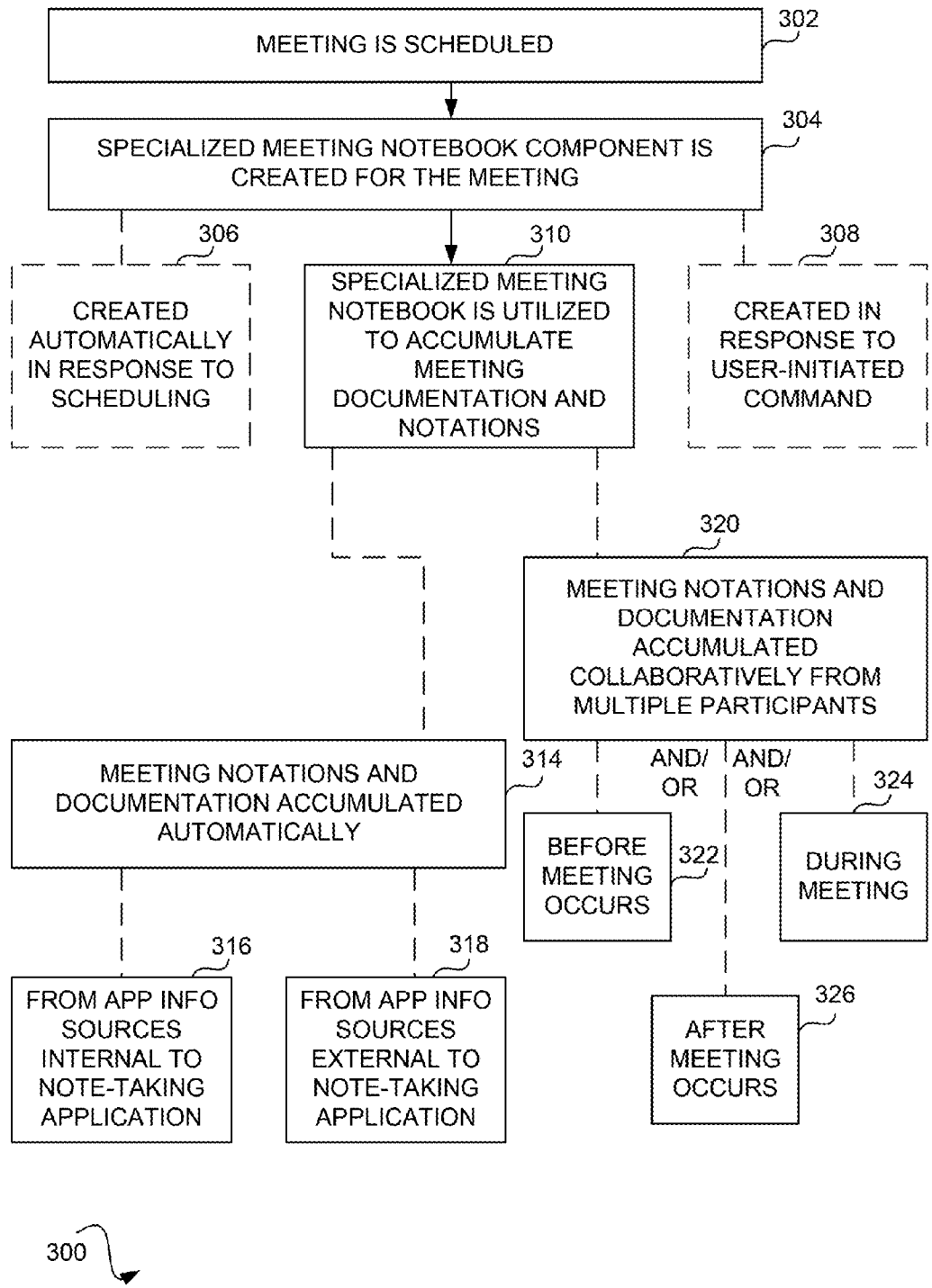
FIG. 3 is block flow diagram demonstrating steps associated with a process for utilizing specialized functions of the note-taking application to accumulate meeting documentation and notations.

FIG. 3 is block flow diagram showing a series of steps associated with a process 300, the steps being carried out in the context of note-taking application components shown in FIG. 2. Accordingly, FIGS. 2 and 3 will be described in conjunction with one another. As is shown in FIG. 2, the note-taking application includes a component 204 that supports creation of a specialized notebook component (e.g., a notebook page, a collection of notebook pages, or a notebook, etc.) for facilitating an accumulation of meeting documentation and notations in relation to a specific meeting or a group of meetings (e.g., a series of meetings).

Those skilled in the art will appreciate that it is also within the scope of the present invention for the specialized notebook component to be created differently than is described in relation to FIGS. 2 and 3. For example, in one embodiment, the specialized notebook component is alternatively, partially, or additionally created by a client side application component. In another embodiment, the component is also, partially or alternatively, created by the centralized server itself. Still further, in one embodiment, the system is configured to allow a pre-existing notebook component within the application to be selected (e.g., selected by the user) to operate as the specialized notebook component. Thus, the concept of "creating" the specialized notebook component should be broadly construed.

Block 302 represents a scheduling of a meeting, a step which may be initiated from within the note-taking application but is just as likely, if not more likely, to be initiated from an application environment outside of the note-taking application. It is to be understood that scheduling generally refers to creation of a meeting event regardless of whether an actual day and/or time is tied to the event. In one embodiment, the core functions of creating and maintaining a record of the meeting event occurs within a software application outside of the note-taking application that supports calendaring and/or scheduling functions. In another embodiment, embodiments described herein (illustratively including the functions of creating and maintaining a record of the meeting event) occur in the context of a single application that combines note-taking application functionality and calendar application functionality together into a single application. In still another embodiment, the meeting is scheduled without any computer-related functionality, such as when a meeting is added to a "pen and paper" type calendar system. This latter alternative, and how it leads to functions that occur within the note-taking application, will be discussed in more detail below.

In accordance with block 304, the next step in the process is creation by component 204 of a specialized meeting focused component within the note-taking application for the scheduled meeting. The specialized notebook component created by component 204 is created within the note-taking application but the created specialized notebook component may be made accessible from an application environment outside of the note-taking application (or, the note-taking application may itself be integrated into a larger application system), such as the application environment where the meeting was scheduled. For example, an interface for editing the specialized notebook component may be made accessible from within a word processing application, a slide show presentation application, an online meeting application or elsewhere despite the fact that the specialized notebook component itself is essentially an owned construct of the note-taking application. So, the concept of creating a specialized notebook component "within the note-taking" application is to be construed broadly enough to encompass a scenario in which the newly created specialized notebook component is made accessible beyond the boundaries of the note-taking application itself, such as (but certainly not limited to) within an online meeting application.

In one embodiment, the specialized notebook component is created in response to a user-initiated or automatically initiated electronically communicated command for the specialized component to be created. In theory, this command may precede or be after the actual scheduling of the meeting or may not even require any scheduling of a meeting at all. Or, the meeting event and the corresponding specialized notebook component may be created at the same time. It is also possible to create a specialized notebook component for a meeting event for which no record exists in an electronic format (e.g., a meeting scheduled using a "pen and paper" system). In these circumstances, a user may desire to create and use an instance of the specialized notebook component for the meeting despite the lack of an electronic manifestation of the meeting. Those skilled in the art will appreciate that there are also many other types of meetings for which users will create and use an instance of the specialized notebook component. Another example, certainly not by limitation, is an online adhoc meeting such as a meeting by way of an instant message conversation. All types of meetings carried out by any means of communication are to be considered within the scope of the present invention. Finally, it is worth noting that creation of the specialized notebook component is not necessarily contingent upon the existence of any actual corresponding meeting but, in most cases, there will be an associated meeting event or events.

In accordance with block 308, a command control (e.g., a button, a link, a pull-down function, etc.) for initiating creation of the specialized notebook component is provided in the note-taking application and/or in an external application such as but not limited to a word processing application, a calendaring application, a scheduling application, or an online meeting application. When the link is activated, the note-taking application responds programmatically by initiating creation of the specialized meeting notebook component. The trigger mechanism may be configured for user-activation (e.g., a button that is pressed by the user in order to initiate creation of the component within the note-taking application, or initiation of creation upon recognition of an appropriate voice-activated command or an appropriate touch screen gesture or an appropriate gesture in 3-dimensional space) or for automatic activation (e.g., a series of actions that occur within an application outside of the note-taking application initiate an automatic creation of the component within the note-taking application) without departing from the scope of the present invention.

Block 306 represents the scenario in which the specialized meeting notebook component is created automatically in response to a meeting being scheduled in an electronic format. In this case, the creation function is triggered automatically, semi-automatically or manually in response to the scheduling of the meeting event. For example, in one embodiment, component 204 is programmatically configured to create the specialized notebook component in response to, or as part of, the meeting being scheduled by way of a scheduling component 206 built into (or made accessible to) the note-taking application itself (component 206 is shown in dots to signify that the note-taking application may or may not have integrated scheduling functionality). Another scenario is that component 204 is programmatically configured to automatically create the specialized notebook component in response to a received indication that a meeting has been scheduled within an application outside of the note-taking application itself.

In accordance with block 310, the next step in the process is an accumulation into the specialized meeting notebook component of documentation and notations related to the meeting. These functions are illustratively managed, programmatically speaking by a management component 208 shown in the FIG. 2 depiction of the note-taking application. As will become more apparent, component 208 illustratively manages inputs from multiple users (e.g., multiple meeting participants) in a distributed collaboration scheme. However, component 208 also manages automatically generated input originating from sources inside (block 316) and/or outside (block 318) of the actual note-taking application environment. In one embodiment, component 208 also manages processes related to causing the note-taking application to respond appropriately to application configuration variables and settings received from one or more users of the note-taking application.

Figure 4:
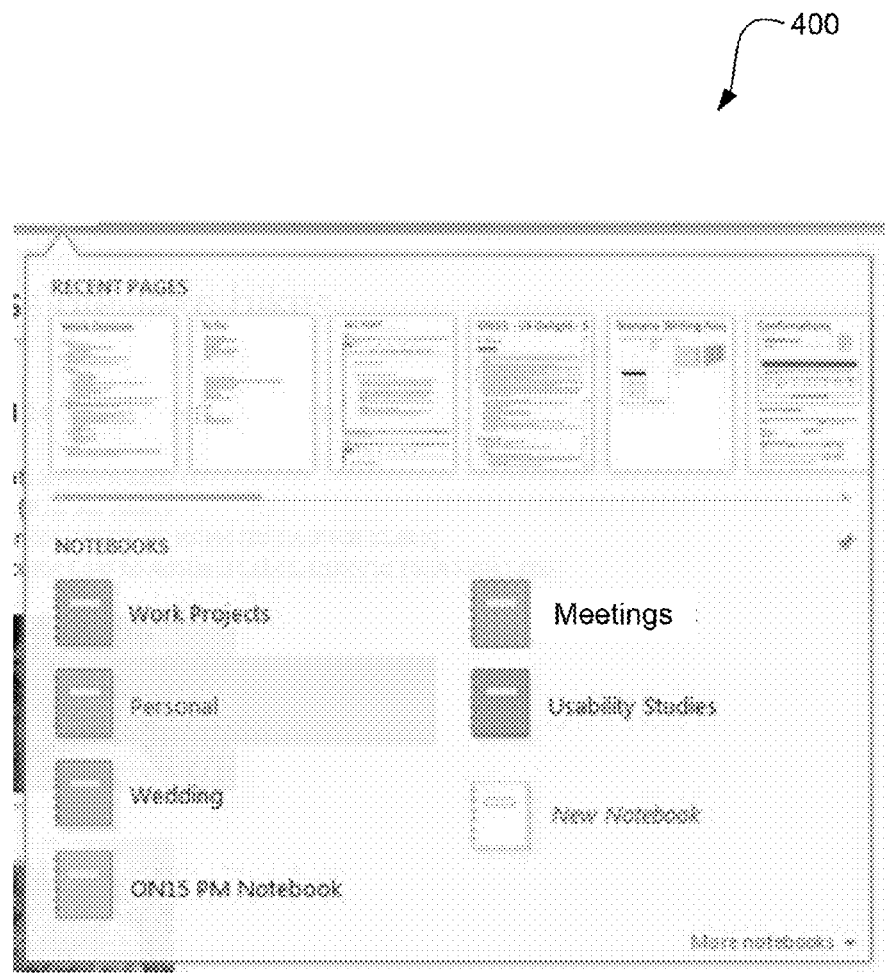
FIGS. 4-13 are examples of user interface screenshots and components.

FIG. 4 is an example of a screenshot 400 that, in one embodiment, is included in the note-taking application. Screenshot 400 includes a listing of notebooks that have been created within the system. Above the listing of notebooks is a listing of pages that the user has recently accessed. The pages in the recent pages listing are illustratively pages included in the individual notebooks included in the listing of notebooks. Thus, application enables a user to navigate to a particular notebook page either by simply choosing a page from the recent page listing or by selecting and then navigating through one of the notebooks in the notebook listing. In one embodiment, navigating through a notebook can mean navigating through a tabbed organization structure. In other words, the pages in a given notebook are sub-divided into different collections of pages, each collection having a tab that indicates the nature of the content in that collection. In other embodiments, there is also support in the application for collections of collections (e.g., sub-collections).

The notebook pages are illustratively free-form in terms of how and where users are allowed to submit and edit content by way of the application user interfaces. Further, in one embodiment, users of the note-taking application generally are not required to issue a save order or command because the note-taking application automatically saves the data, for example as it is entered. In one embodiment, the history of edits (e.g., either in content or on notebook structure or any other type of edits) is stored on an application server so as to support subsequent review by a user or users of the application. Still further, in one embodiment, the note-taking application is configured to conveniently assist in the user-initiated organization of the content into the described notebook-style (e.g., tabbed) organization system. Users of the application are provided with functions that enable them to selectively tab, re-tab, re-organize, add content to, subtract content from, and otherwise manipulate content stored on notebook pages that are selectively placed and moved around within electronic notebooks and the various tabbed components thereof.

As is shown in screenshot 400, one of the notebooks in the system is illustratively a "meetings" notebook. This is just one of many potential examples of a specialized meeting notebook component created within the note-taking application in accordance with step 304 in process 300. In another embodiment, the created specialized meeting component includes a meeting notebook page within the meeting notebook or elsewhere within the application organization structure. Such a page is similar in spirit to the pages included in the recent pages listing of screenshot 400. The created specialized meeting component may be blank initially or may include pre-existing template functionality for guiding the user actively or passively through a structure for accumulating documentation and notations for the meeting associated with the meeting page. As will become apparent, it is within the scope of the present invention for meeting related content to be added to the specialized meeting notebook page either manually (e.g., by way of user input into a user interface), automatically (e.g., as is indicated by block 314, information gathered electronically during the meeting scheduling process is automatically imported into the content of the meeting notebook page) or semi-automatically (e.g., information is automatically imported into the content of the meeting notebook page only after a user okays the importation of information).

In one embodiment, component 208 manages the created specialized meeting notebook components in a manner similar to how they manage other notebook components within the note-taking application. In another embodiment, this means access to the specialized notebook components can be selectively shared or not shared based on user preferences and system settings. For example, the system is illustratively configured to enable a user to selectively or not share access to a meeting notebook, to a meeting notebook page, or even to particular collections of content included in a notebook page. For example, in one embodiment, an instantiation of a specialized notebook page includes an area designated for recording notations about the corresponding meeting that are only viewable by the user that enters them, and also includes a separate area designated for recording notations about the same meeting that are viewable by all users who have shared access to the meeting notebook (or a sub-set of users chosen by the user entering the notations, or by all users who have shared access to the meeting notebook that contains the meeting notebook page, etc.). Those skilled in the art will appreciate that these are just examples of how component 208 may be configured to manage access to the specialized meeting notebook components.

Figure 5:
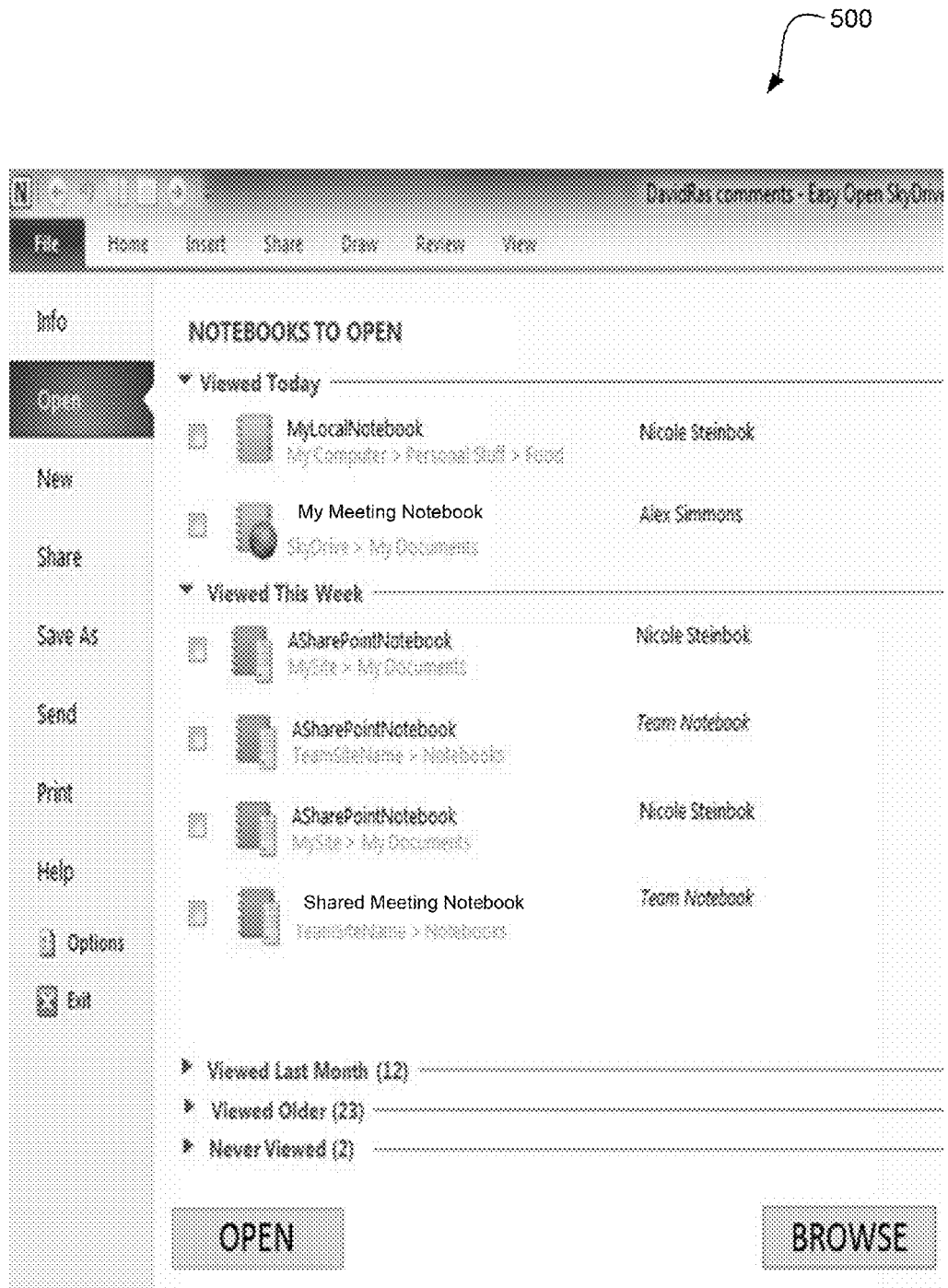

FIG. 5 is an example of a screenshot 500 that, in one embodiment, is included in the note-taking application.

Screenshot 500 includes a listing of notebooks listed in accordance with when they were last accessed by the user. This demonstrates how the management of notebook components may be handled in a manner similar to a document in a document management system. For example, the listing in FIG. 5 indicates a storage location for each notebook, and the storage location is notably not the same for every notebook. The notebooks and their related content can be conveniently moved around to different storage locations, cut, paste, copied and otherwise managed on a high level.

The listing in screenshot 500 includes two different meeting notebooks that are illustratively managed by component 208 of the note-taking application. The one of these meeting notebooks identified as a "Team Notebook" is illustratively a shared meeting notebook that includes meeting notebook pages to which component 208 shares access with all members of the user's team. The other meeting notebook belongs to user Alex Simmons and component 208 illustratively shares the included meeting notebook pages with a different set of users than those with whom access to the team notebook is shared. Again, those skilled in the art will appreciate that these are just examples of how component 208 may be configured to manage access to the specialized meeting notebook components.

As has been alluded to, a specialized meeting notebook component can be connected or otherwise associated to a particular meeting (or group of meetings) and then subsequently accessed through a variety of different application interface points, including points inside of the note-taking application as well as points outside of the note-taking application in other application environments. In one embodiment, the system is configured to enable different levels of access to meeting-tracking information and/or functions depending upon the particular point at which the specialized meeting notebook component was created and/or accessed. For example, the specialized meeting notebook component initially created from within the note-taking application itself may not be exactly the same in terms of appearance and/or functionality as the specialized meeting notebook component initially created from within a calendar application, or a word processing application or an online meeting application. Each application may have its own version of how the specialized meeting notebook component is initially created, of how it appears in the particular application context, and of the range and selection of functions it provides. The amount and selection of meeting information accessible from the specialized meeting notebook component may also vary based on the application context in which the component is opened. In other words, opening the component within the note-taking application may enable access to a broader range of information than will be available if the component were to be opened in a different application context, such as an online meeting application, etc.

In one embodiment, the amount and selection of meeting information and functions accessible from the specialized meeting notebook component also or alternatively varies based on the type of meeting for which the component was created. For example, different meeting applications (e.g., web conference applications, shared desktop conference applications, phone conference applications, etc.) may support different levels of access depending upon system configurations and application development preferences. Or, different meeting environments (e.g., unified communication environment versus online shared desktop, etc.) may support different levels of access depending upon system configurations and application development preferences.

Finally, the amount and selection of meeting information and functions accessible from the specialized meeting notebook component also or alternatively varies based on user or system restrictions related to whether meeting notes are intended to be shared or private in nature. In one embodiment, the content of a particular client user's instantiation of a particular specialized meeting notebook component may be updated automatically (e.g., an automatic periodic synchronization between the user's client device and the application server operating in the cloud) or manually (e.g., in response to a user-initiated synchronization command) while the meeting is occurring. Once synchronized, the changes are illustratively published or otherwise made accessible to all participants having access to the particular notebook component. In another embodiment, access to a function for emailing or otherwise electronically communicating meeting note content is included in the specialized meeting notebook component (or in a different location within or outside of the note-taking application) such that activating the function auto-populates meeting attendees into the "to" line.

Figure 6:
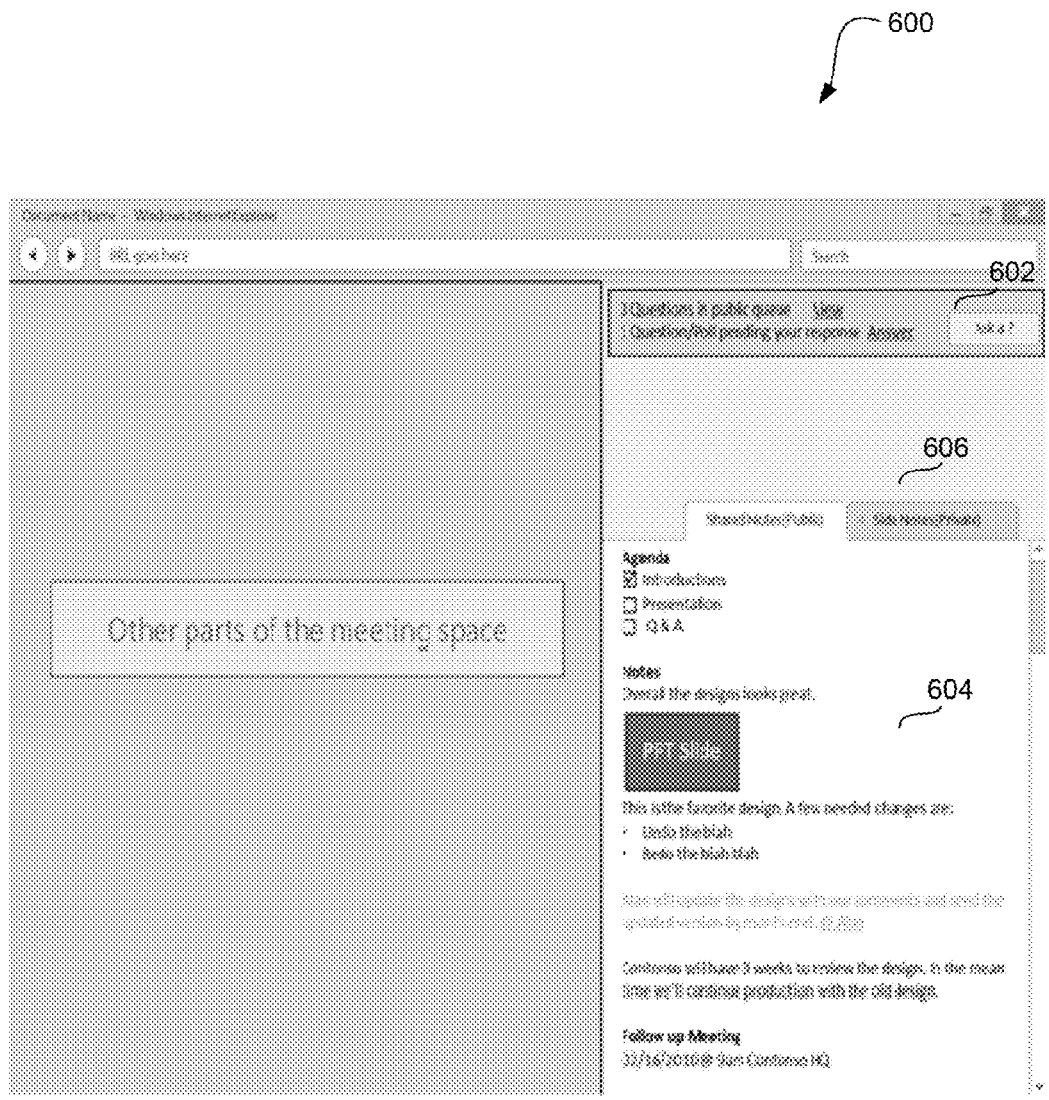

FIG. 6 is an example of a screenshot 600 that, in one embodiment, is included in the note-taking application. Also or alternatively, screenshot 600 and its associated functionality may be provided by way of a different application environment such as, but not limited to, an online meeting application, a word processing application, a scheduling or an electronic communication management application.

Screenshot 600 includes a space 602 for sharing a question with meeting participants (e.g., a polling question) and answering questions posted other meeting participants. In one embodiment, when a question is asked and/or answered, a record of this event is posted in a shared notes area 604. Notes posted in the shared notes area 604 are illustratively published to all meeting participants. For example, when a meeting participant posts content into area 604, the content is published to all meeting participants when the client application synchronizes with a centralized server. The server synchronizes the content in the shared area of all meeting participants. As is shown, the shared notes area includes a meeting agenda with listing items that can be checked off after each event has been covered. In one embodiment, any kind of multimedia content can be added to the shared notes area, such as but not limited to a power point slide, a video clip, a photograph, an audio clip, etc. In another embodiment of automatically added data synchronized to the central server, the system illustratively adds an attribution indicating which user added which content, so that each user will see from whom which content originates.

Screenshot 600 also includes a selectable area 606. Area 606 operates in a manner similar to area 604 but area 606 is a private notes area. Content posted to the private notes area is not shared with the other meeting participants. Thus, area 606 gives the user a place to make private notes. When the user wishes, the record of the meeting can be retrieved at any time, even after the meeting, and utilized to review notes pasted in any of the areas of the user interface.

Figure 7:
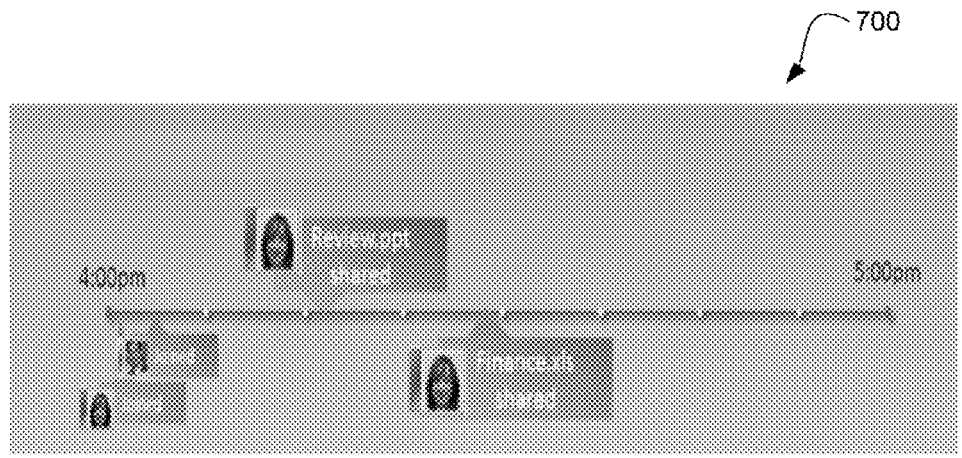

FIG. 7 is an example of a user interface component 700 that, in one embodiment, is included in the note-taking application, for example, as a component accessible as part of or by way of an instance of the specialized meeting notebook component. Also or alternatively, component 700 and its associated functionality may be provided by way of a different application environment such as, but not limited to, an online meeting application, a word processing application, a scheduling or an electronic communication management application.

User interface component 700 includes a timeline view of events that occur during the meeting. In accordance with one aspect of the present invention, some notes recorded in the specialized meeting notebook component are provided by way of user input (e.g., input from meeting participants). However, in another aspect of the present invention, at least some of the notes recorded in the specialized notebook are automatically generated based on access by the note-taking application to meeting-pertinent information. For example, as is shown in FIG. 7, the note-taking application illustratively may track when meeting participants come and go. While this is shown in the time line of user interface component 700, similar or different automatically generated content can be added to user interface areas such the shared note area described in relation to screenshot 600.

Figure 8:
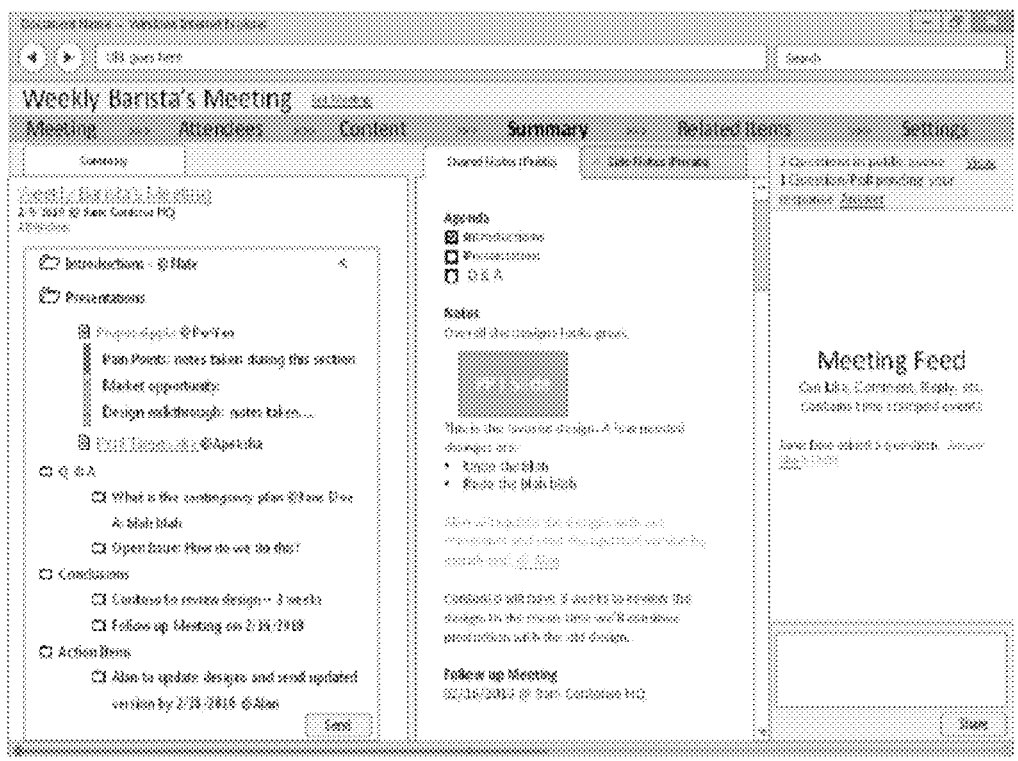

FIG. 8 is an example of a screenshot 800 that, in one embodiment, is included in the note-taking application. Also or alternatively, screenshot 800 and its associated functionality may be provided by way of a different application environment such as, but not limited to, an online meeting application, a word processing application, a scheduling or an electronic communication management application.

Screenshot 800 is illustratively an example of the specialized meeting notebook component described herein. The component has illustratively been created so as to be associated with a particular meeting (i.e., the "Weekly Barista's Meeting"). As is shown, access to a plurality of different meeting-related views is provided. The views include attendees, content, summary, related items and settings. Information about the meeting is recorded in the forms and functions provided under each of the tabs. Some of the meeting information is automatically added to the component based on meeting-pertinent information to which the note-taking application has access. Other of the meeting information is added based on input from one or more meeting participants.

Figure 9:
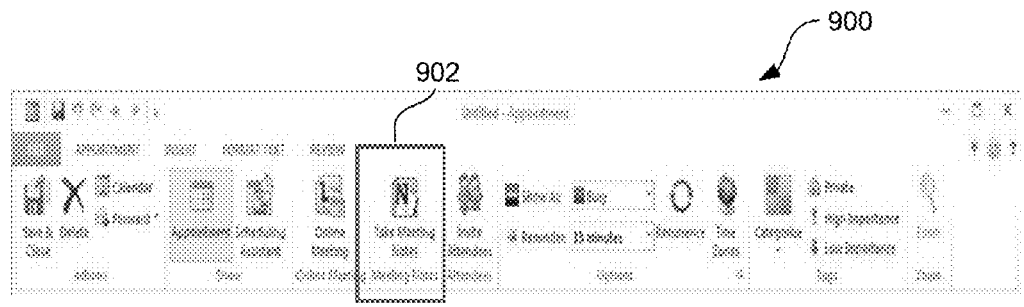

In accordance with one aspect of the present invention, applications outside of the note-taking application environment provide a user-selectable mechanism for initiating access to a specialized meeting notebook component as described herein. FIG. 9 is an example of a tool bar 900. Tool bar 900 is illustratively provided within a scheduling, calendar and/or electronic communication management application. As is indicated by block 902, a button is provided as a mechanism for initiating access to a specialized meeting notebook component as described herein.

Figure 10:
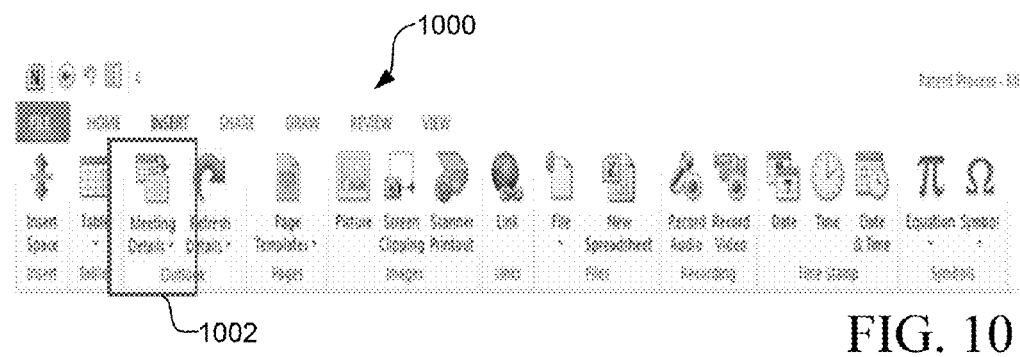
Figure 11:
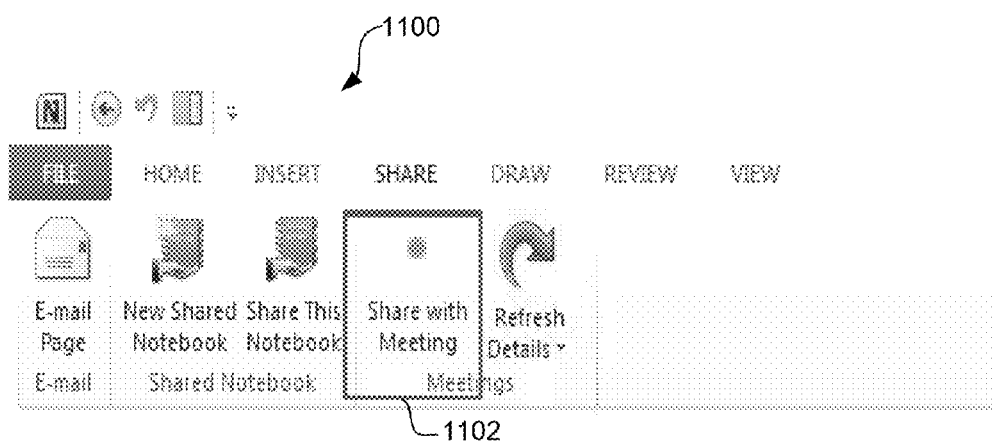
Figure 12:
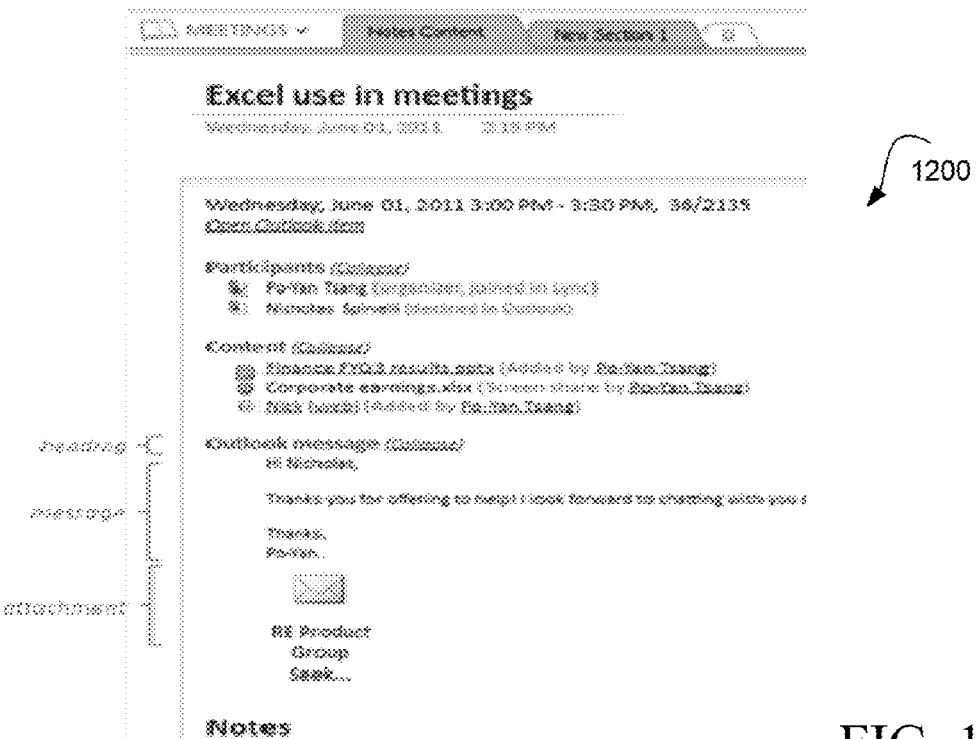
Figure 13:
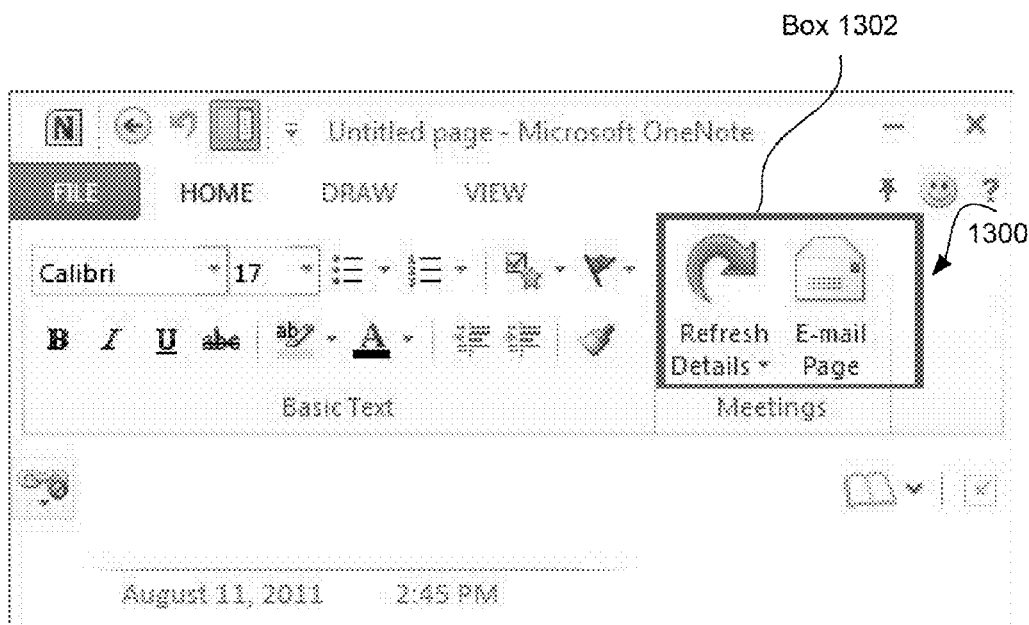

FIG. 10 is an example of a tool bar 1000. Tool bar 1000 is illustratively provided within a note-taking application. As is indicated by block 1002, a button is provided as a mechanism for initiating access to a specialized meeting notebook component as described herein. FIG. 11 is an example of a tool bar 1100. Tool bar 1100 is illustratively provided within a note-taking application. As is indicated by block 1102, a button is provided as a mechanism for sharing access to a specialized meeting notebook component as described herein. FIG. 12 is an example screenshot 1200 that demonstrates an example of page content of a notebook page in the note-taking application, illustratively a specialized meeting notebook component as described herein. FIG. 13 is an example of a user interface component utilized within the note-taking application or elsewhere. The functions in box 1302 enable a user to manually initiate a synchronization of the client meeting data with the server meeting data (included updates from other meeting participants). The other button in box 1302 enables the user to email the meeting notebook information, for example to other meeting participants. In one embodiment, user selection of the email page buttons provides the user with a "to" field automatically populated with contact information for one or more meeting participants.

Embodiments of specialized meeting notebook components described herein enable all participants to collaborate in creating and updating a collection of shared meeting notes (block 320 in FIG. 3). In one embodiment, some information incorporated into an instance of a specialized meeting notebook component is automatically incorporated (block 314 in FIG. 3). For example, in one embodiment, the component is automatically populated with information as to who is attending the meeting, as to from where people are attending, as to the time at which people come or go from the meeting, etc. This type of information may be automatically or manually recorded in the component without departing from the scope of the present invention. Users are illustratively all able to use the specialized component to see this type of information. In one embodiment, information as to as to how people responded to the meeting invitation (e.g., accept/decline, etc.) is automatically incorporated. This is one of many examples of data illustratively collected (e.g., automatically) and posted (e.g., automatically) to the specialized component before the meeting actually occurs. In one embodiment, this pre-meeting data is collected from outside the application from which the specialized component originates, for example, from the meeting calendaring or scheduling system where the meeting logistics are handled.

The specialized meeting notebook component provides functions that enable participants to quickly share and summarize what happened during a meeting. The summary may be human generated, client machine generated, server robot generated, or a combination of all three. The summary can also be real-time updated, automatically updated periodically or updated upon a user-initiated request for updating. The specialized component enables participants to easily understand, from its content information, why they are at the meeting and what they need to do as a result of the meeting. Further, the note recording functions of the specialized component enables users to easily communicate with one another and ask poll questions of meeting attendees. Still further, the specialized component enables meeting participants (and potentially others) to easily find content from previous related meetings.

It is to be understood that information can be automatically, manually or semi-automatically captured and provided to (block 320 in FIG. 3) an instance of a specialized meeting notebook component at any time before (block 322), during (block 324) or after (block 326) a meeting. This can even be many days before or after the actual meeting. Further, meeting information can be captured from different application sources (meeting conferencing applications, calendar applications, mailing applications, etc.) and intelligently merged into the corresponding specialized meeting notebook component. Further, it is within the scope of the present invention to create and utilize a specialized meeting notebook component for many different types of meetings (adhoc meetings, adhoc document broadcasts, scheduled meetings, pen-and-paper scheduled meetings, etc.).

Embodiments described herein pertain to utilization of a notebook component within a note-taking application as the primary mechanism for recording notations and providing documentation related to a particular meeting. The meeting participants are provided with centralized access to the notebook component and thus are able to update the notebook record of the meeting collaboratively and in real time. In addition to user-driven updates, updates may also be generated on an automatic or semi-automatic basis. Updates may be made before, during or after the actual meeting. Updates may originate from an application data source outside of the note-taking application itself.

FIGS. 14-17 show a number of different embodiments for computing devices upon which embodiments of the present invention may be implemented. While these embodiments will be described in FIGS. 14-17, it should be noted that these are not exclusive, but are provided as illustrative and exemplary descriptions of embodiments of devices applicable to embodiments of the present invention.

While systems (e.g., software applications) that implement a note-taking application consistent with embodiments described herein can primarily reside on a client device such as those specifically shown herein, such systems could just as easily be embodied elsewhere, such as in a cloud computing environment, possibly but not necessarily in conjunction with the same environment within which application configuration variables and settings are centrally stored. Cloud computing provides computation, software, data access, and storage services that generally do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the functions described herein can be provided from a service provider at a remote location using a cloud computing architecture. Alternatively, they can be provided from a conventional server, or they can be installed on a client device directly.

Figure 14:
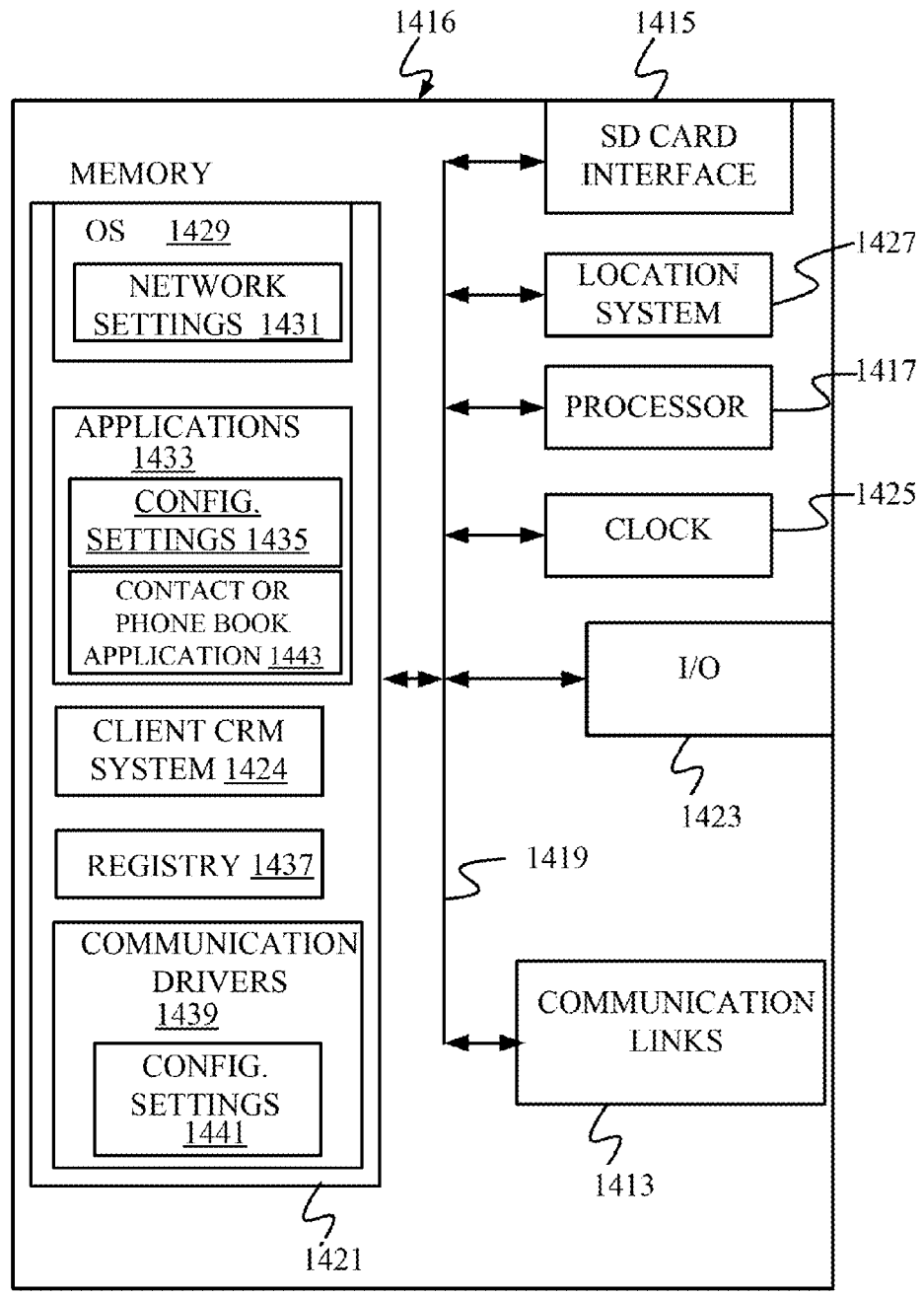
FIG. 14 is a simplified block diagram of one example of a client device.
Figure 15:
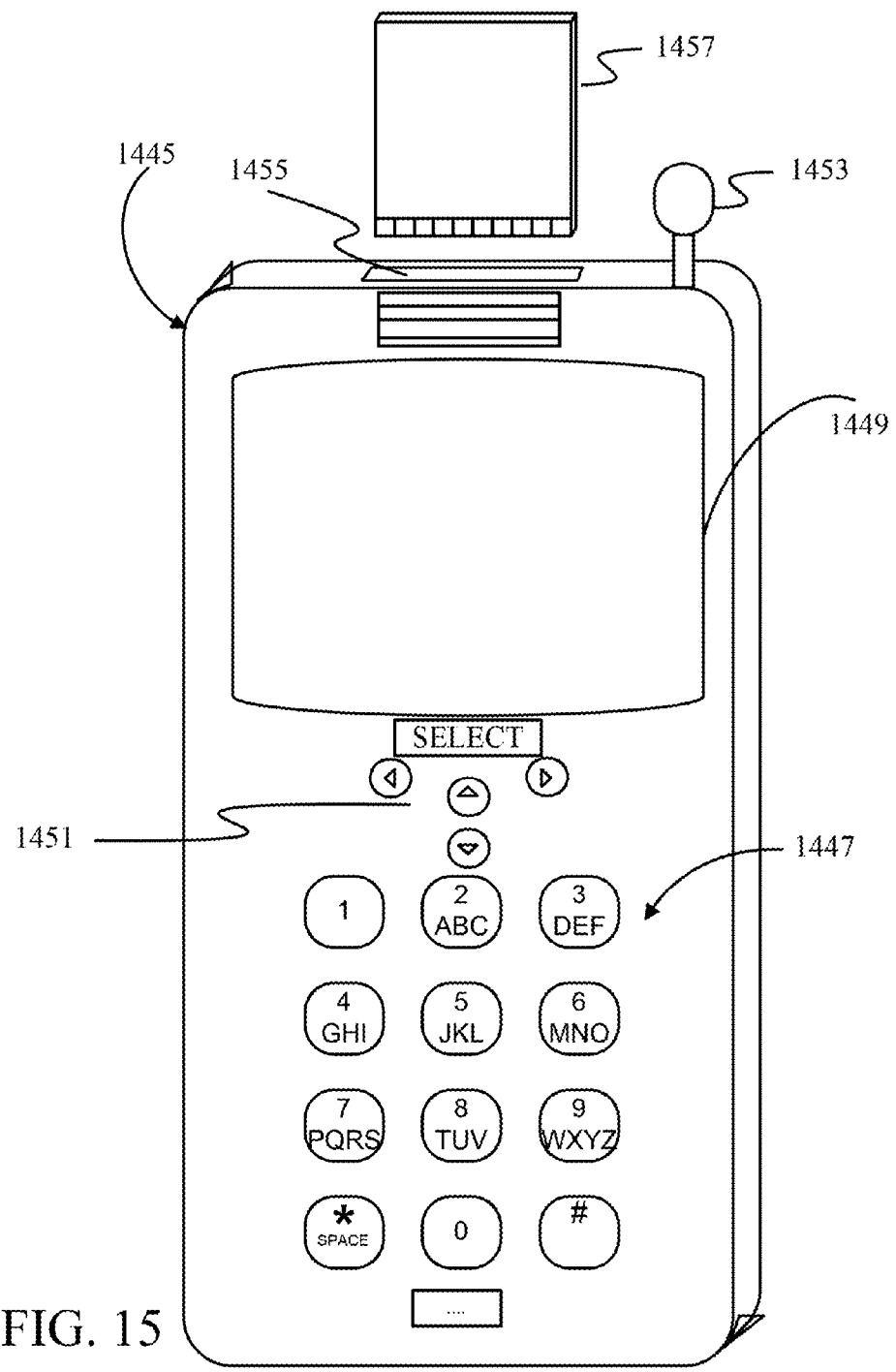
FIG. 15 is a schematic diagram of an example of a smart phone or mobile phone.
Figure 16:
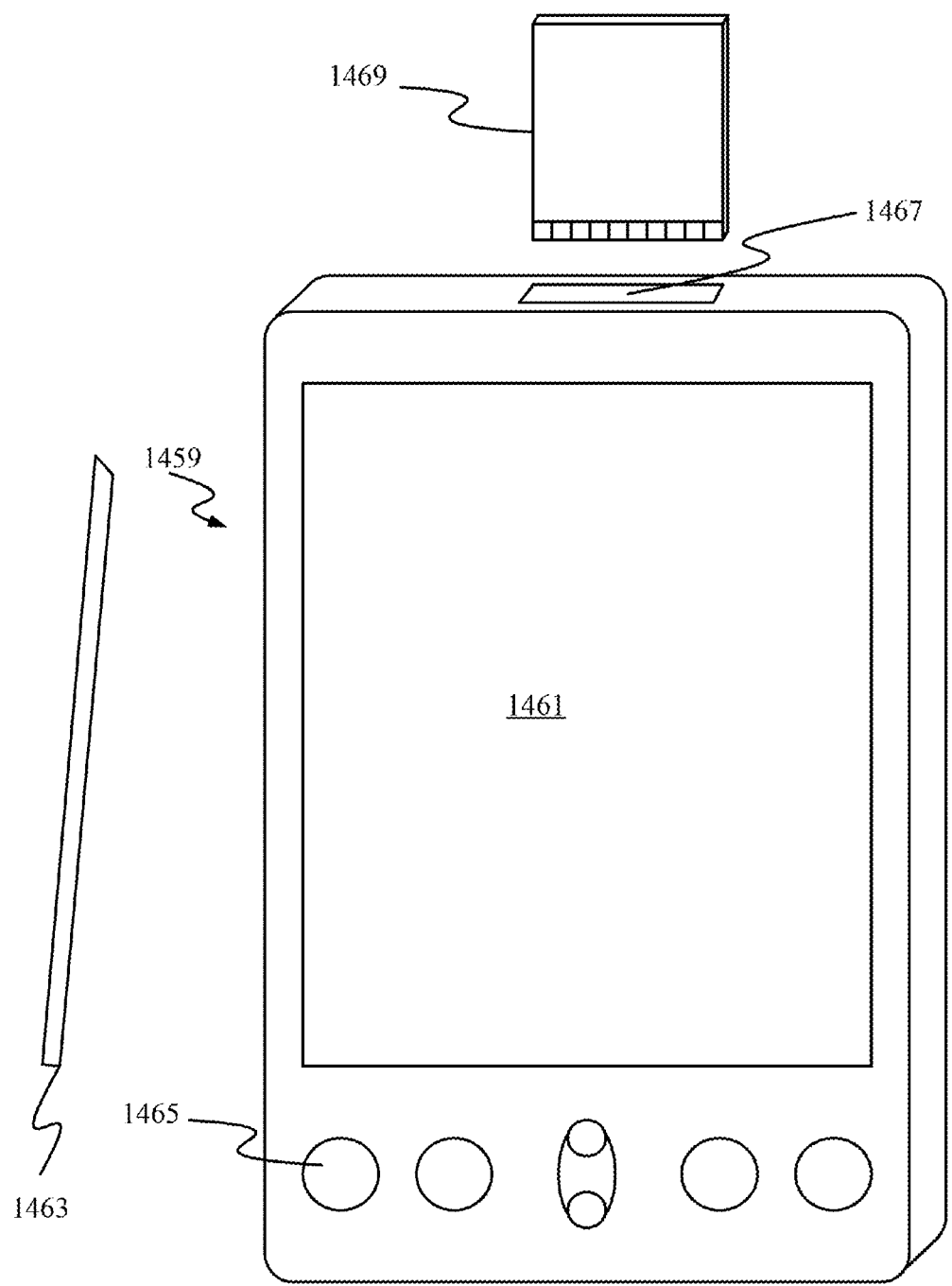
FIG. 16 is a schematic diagram of a personal digital assistant (PDA) or a multimedia player or a slate or tablet computing device.

In any case, FIG. 14 is a simplified block diagram of one illustrative embodiment of a handheld or mobile computing device that can be used as a client device, upon which systems that implement embodiments of the present invention may be deployed. FIGS. 15 and 16 are examples of handheld or mobile devices.

FIG. 14 provides a general block diagram of the components of a client device 1416. In the device, a communications link 1413 is provided that allows the handheld device to communicate with other computing devices and under some embodiments provides a channel for receiving information automatically, such as by scanning. Examples of communications link 1413 include an infrared port, a serial/USB port, a cable network port such as an Ethernet port, and a wireless network port allowing communication though one or more communication protocols including General Packet Radio Service (GPRS), 1Xrtt, and Short Message Service, which are wireless services used to provide cellular access to a network, as well as 802.11 and 802.11b (Wi-Fi) protocols, and Bluetooth protocol, which provide local wireless connections to networks.

Under other embodiments, applications or systems are received on a removable Secure Digital (SD) card that is connected to a SD card interface 1415. SD card interface 1415 and communication links 1413 communicate with a processor 1417 along a bus 1419 that is also connected to memory 1421 and input/output (I/O) components 1423, as well as clock 1425 and location system 1427.

I/O components 1423, in one embodiment, are provided to facilitate input and output operations. I/O components 1423 for various embodiments of the device can include input components such as buttons, touch sensors, touch screens, proximity sensors, microphones, tilt sensors, and gravity switches and output components such as display device, a speaker, and or a printer port. Other I/O components 1423 can be used as well.

Clock 1425 illustratively comprises a real time clock component that outputs a time and date. It can also, illustratively, provide timing functions for processor 1417.

Location system 1427 illustratively includes a component that outputs a current geographical location of device 1416. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 1421 stores operating system 1429, network settings 1431, applications 1433, application configuration settings 1435, registry 1437, communication drivers 1439, and communication configuration settings 1441. Memory 1421 can include all types of tangible volatile and non-volatile computer-readable memory devices. Memory 1421 stores computer readable instructions that, when executed by processor 1417, cause the processor to perform computer-implemented steps or functions according to the instructions. Processor 1417 can be activated by other components to facilitate their functionality as well.

Examples of the network settings 1431 include things such as proxy information, Internet connection information, and mappings. Application configuration settings 1435 include settings that tailor the application for a specific enterprise or user. Communication configuration settings 1441 provide parameters for communicating with other computers and include items such as GPRS parameters, SMS parameters, connection user names and passwords.

Applications 1433 can be applications that have previously been stored on the device 1416 or applications that are installed during use. In one embodiment, applications 1433 can be part of operating system 1429, or hosted external to device 1416, as well.

FIGS. 15 and 16 provide examples of devices 1416 that can be used, although others can be used as well. In FIG. 15, a smart phone or mobile phone 1445 is provided as the device 1416. Phone 1445 includes a set of keypads 1447 for dialing phone numbers, a display 1449 capable of displaying images including application images, icons, web pages, photographs, and video, and control buttons 1451 for selecting items shown on the display. The phone includes an antenna 1453 for receiving cellular phone signals such as General Packet Radio Service (GPRS) and 1Xrtt, and Short Message Service (SMS) signals. In some embodiments, phone 1445 also includes a Secure Digital (SD) card slot 1455 that accepts a SD card 1457.

The mobile device of FIG. 16 is a personal digital assistant (PDA) 1459 or a multimedia player or a slate or tablet computing device, etc. (hereinafter referred to as PDA 1459). PDA 1459 includes an inductive screen 1461 that senses the position of a stylus 1463 (or other pointers, such as a user's finger) when the stylus is positioned over the screen. This allows the user to select, highlight, and move items on the screen as well as draw and write. PDA 1459 also includes a number of user input keys or buttons (such as button 1465) which allow the user to scroll through menu options or other display options which are displayed on display 1461, and allow the user to change applications or select user input functions, without contacting display 1461. Although not shown, PDA 1459 can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections. In one embodiment, device 1459 also includes a SD card slot 1467 that accepts a SD card 1469.

Note that other forms of the devices 1416 are possible. Examples include tablet or slate computing devices, music or video players, and other handheld computing devices.

Figure 17:
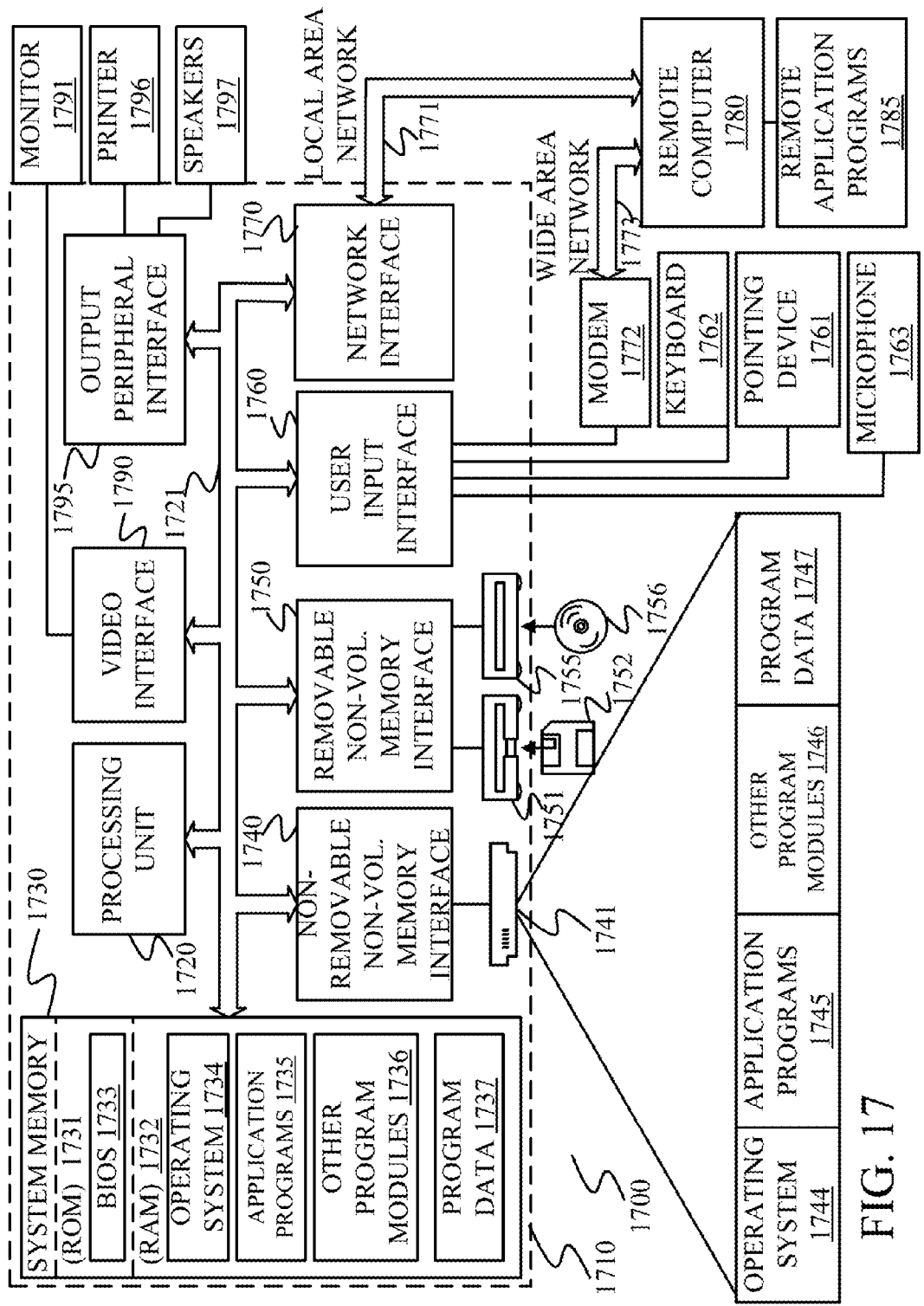
FIG. 17 is a schematic diagram of a computer or a computing device.

FIG. 17 is one embodiment of another computing environment. With reference to FIG. 17, an exemplary system for implementing some embodiments includes a general-purpose computing device in the form of a computer 1710. Components of computer 1710 may include, but are not limited to, a processing unit 1720, a system memory 1730, and a system bus 1721 that couples various system components including the system memory to the processing unit 1720. The system bus 1721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 1710 typically includes a variety of computer readable media. Computer readable media can be any available media that can be accessed by computer 1710 and includes both volatile and nonvolatile media, removable and non-removable media. By way of example, and not limitation, computer readable media may comprise computer storage media and communication media. Computer storage media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1710. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 1730 includes computer storage media in the form of volatile and/or nonvolatile memory such as read only memory (ROM) 1731 and random access memory (RAM) 1732. A basic input/output system 1733 (BIOS), containing the basic routines that help to transfer information between elements within computer 1710, such as during start-up, is typically stored in ROM 1731. RAM 1732 typically contains data and/or program modules that are immediately accessible to and/or presently being operated on by processing unit 1720. By way of example, and not limitation, FIG. 17 illustrates operating system 1734, application programs 1735, other program modules 1736, and program data 1737.

The computer 1710 may also include other removable/non-removable volatile/nonvolatile computer storage media. By way of example only, FIG. 17 illustrates a hard disk drive 1741 that reads from or writes to non-removable, nonvolatile magnetic media, a magnetic disk drive 1751 that reads from or writes to a removable, nonvolatile magnetic disk 1752, and an optical disk drive 1755 that reads from or writes to a removable, nonvolatile optical disk 1756 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1741 is typically connected to the system bus 1721 through a non-removable memory interface such as interface 1740, and magnetic disk drive 1751 and optical disk drive 1755 are typically connected to the system bus 1721 by a removable memory interface, such as interface 1750.

The drives and their associated computer storage media discussed above and illustrated in FIG. 17, provide storage of computer readable instructions, data structures, program modules and other data for the computer 1710. In FIG. 17, for example, hard disk drive 1741 is illustrated as storing operating system 1744, application programs 1745, other program modules 1746, and program data 1747. Note that these components can either be the same as or different from operating system 1734, application programs 1735, other program modules 1736, and program data 1737. Operating system 1744, application programs 1745, other program modules 1746, and program data 1747 are given different numbers here to illustrate that, at a minimum, they are different copies. They can also include search components 1702 and 1704.

A user may enter commands and information into the computer 1710 through input devices such as a keyboard 1762, a microphone 1763, and a pointing device 1761, such as a mouse, trackball or touch pad. Other input devices (not shown) may include a joystick, game pad, satellite dish, scanner, or the like. These and other input devices are often connected to the processing unit 1720 through a user input interface 1760 that is coupled to the system bus, but may be connected by other interface and bus structures, such as a parallel port, game port or a universal serial bus (USB). A monitor 1791 or other type of display device is also connected to the system bus 1721 via an interface, such as a video interface 1790. In addition to the monitor, computers may also include other peripheral output devices such as speakers 1797 and printer 1796, which may be connected through an output peripheral interface 1795.

The computer 1710 is operated in a networked environment using logical connections to one or more remote computers, such as a remote computer 1780. The remote computer 1780 may be a personal computer, a hand-held device, a server, a router, a network PC, a peer device or other common network node, and typically includes many or all of the elements described above relative to the computer 1710. The logical connections depicted in FIG. 17 include a local area network (LAN) 1771 and a wide area network (WAN) 1773, but may also include other networks. Such networking environments are commonplace in offices, enterprise-wide computer networks, intranets and the Internet.

When used in a LAN networking environment, the computer 1710 is connected to the LAN 1771 through a network interface or adapter 1770. When used in a WAN networking environment, the computer 1710 typically includes a modem 1772 or other means for establishing communications over the WAN 1773, such as the Internet. The modem 1772, which may be internal or external, may be connected to the system bus 1721 via the user input interface 1760, or other appropriate mechanism. In a networked environment, program modules depicted relative to the computer 1710, or portions thereof, may be stored in the remote memory storage device. By way of example, and not limitation, FIG. 17 illustrates remote application programs 1785 as residing on remote computer 1780. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for conducting a real-time communication session, the method comprising:
    generating a meeting notification that includes at least an indication of invited attendees;
    creating, for the meeting, a specialized meeting notebook component within a first application environment, the specialized meeting notebook component including an association with the meeting and a shared notation area, the shared notation area of the specialized meeting notebook component facilitating an accumulation of meeting notations in relation to the meeting;
    automatically providing, to each of the invited attendees, an indication that the specialized meeting notebook component has been created along with an indication as to how the specialized meeting notebook component is accessed by the invited attendees;
    automatically incorporating, into the specialized meeting notebook component, an item of information obtained from a second application environment that is outside of the first application environment; and
    creating the meeting by establishing a real-time communication session between the attendees, the real-time communication session comprising real-time communications sent between the attendees based on detected user inputs, and the real-time communication session including a user interface component that receives meeting notations into a shared notation area of the specialized meeting notebook component, the shared notation area receiving the meeting notations individually from each of the attendees of the meeting such that the record of the meeting is created collaboratively by the attendees during the real-time communication session.

2. The method of claim 1, wherein the indication as to how the specialized meeting notebook component is accessed by the invited attendees comprises a selectable access link that, when actuated by one of the invited attendees, navigates the invited attendee to the specialized meeting notebook component.

3. The method of claim 1, wherein the first application environment comprises a note-taking application and the second application environment comprises an online meeting or scheduling application.

4. The method of claim 1, wherein receiving meeting notations further comprises receiving meeting notations after the meeting has occurred.

5. The method of claim 1, wherein receiving meeting notations comprises receiving meeting notations before the meeting has occurred.

6. The method of claim 1, wherein receiving meeting notations comprises receiving during the meeting and after the meeting has occurred.

7. The method of claim 1, wherein the item of information at least comprises non-textual media content.

8. The method of claim 1, wherein automatically incorporating an item of information comprises:
    identifying a plurality of items of information from a plurality of different sources that external to the first application environment; and
    incorporating the plurality of items of information into the specialized meeting notebook component.

9. The method of claim 1, and further comprising automatically incorporating, into the specialized meeting notebook component, an indication of when at least one of said attendees joined the particular meeting event.

10. The method of claim 1, and further comprising automatically incorporating, into the specialized meeting notebook component, an indication of when at least one of said attendees posted a notation into the shared notation area.

11. A computing system comprising:
    a processor; and
    a note-taking application configured to receive an indication of a particular meeting event, the note-taking application comprising:
        a meeting notebook creation component configured to create a meeting notebook component based on the indication of the particular meeting event, the meeting notebook component being associated with the particular meeting event; and
        a user interface component configured to generate a user interface display that displays the meeting notebook component, the user interface display comprising:
            a shared notation area configured to receive meeting notations from a plurality of users identified as attendees of the particular meeting event so as to collaboratively create a record of the particular meeting event, wherein the plurality of users identified as attendees are identified at least in part by a list of users included in the indication of a particular meeting event, and wherein the shared notation area is configured to display an attribution indicating which user added which content;
            a non-shared notation area into which meeting notations are posted by one of the plural of users but not shared with other of the plurality of users; and
            a timeline view that indicates when at least one of attendees joined the particular meeting event; and
    a real-time communication system configured to create the meeting by establishing a real-time communication session between the attendees, the real-time communication session comprising real-time communications sent between the attendees based on detected user inputs.

12. The computing system of claim 11, wherein the shared notation area is accessible from the note-taking application and a set of applications outside of the note-taking application.

13. The computing system of claim 12, wherein each application in the set of applications is configured to edit the meeting notebook component.

14. The computing system of claim 11, wherein the note-taking application is configured to collaboratively create the record of the particular meeting event in real time by accepting meeting notations posted by the plurality of users in essentially real time.

15. The computing system of claim 14, wherein accepting the meeting notations posted by the plurality of users further comprises accepting at least one meeting notation posted by a user before occurrence of the meeting event.

16. The computing system of claim 11, wherein the note-taking application is configured to receive indications of meeting events from a plurality of different applications and to create a corresponding meeting notebook component for each of the meeting events.

17. A computer-implemented method for conducting a real-time communication session, the method comprising:
generating a meeting notification that includes at least an indication of invited attendees for the meeting;
creating a specialized meeting notebook component for the ing, the specialized meeting notebook component including an association with the meeting and a shared notation area for accumulation of meeting notations from the invited attendees in relation to the meeting to collaboratively create a record of the meeting;
automatically providing, to each of the invited attendees, an indication that the specialized meeting notebook component has been created along with an indication as to how the specialized meeting notebook component is accessed by the invited attendees;
creating the meeting by establishing a real-time communication session between the attendees, the real-time communication session comprising real-time communications sent between the attendees based on detected user inputs, and the real-time communication session including a user interface component that receives meeting notations into a shared notation area of the specialized meeting notebook component, the shared notation area receiving the meeting notations individually from each of the attendees of the meeting such that the record of the meeting is created collaboratively by the attendees during the real-time communication session;
prior to the creation of ting by establishing the real time communication session, receiving a meeting notation, from at least one of the invited attendees, into the shared notation area of the specialized meeting notebook component; and storing the received meeting notation in the specialized meeting notebook component; and
generating a user interface display that includes a timeline view that indicates when the meeting notation was received from the at as one invited attendee.

18. The method of claim 17, wherein the received meeting notation comprise a first set of meeting notations, and further comprising:
during the meeting, receiving a second set of meeting notations in the shared notation from the attendees of the meeting.

19. The method of claim 17, wherein the indication as to how the specialized meeting notebook component is accessed by the invited attendees comprises a selectable access link to the specialized meeting notebook component.

20. The method of claim 19, and further comprising:
prior to occurrence of the meeting, receiving actuation of the selectable access link by a particular one of the invited attendees, and, in response, navigating the particular invited attendee to the specialized meeting notebook component.

* * * * *